(12) United States Patent
Krisko

(10) Patent No.: US 6,652,974 B1
(45) Date of Patent: Nov. 25, 2003

(54) HARD, SCRATCH-RESISTANT COATINGS FOR SUBSTRATES

(75) Inventor: Annette J. Krisko, Prairie de Sac, WI (US)

(73) Assignee: Cardinal IG Company, Eden Prairie, MN (US)

( * ) Notice: Subject to any disclaimer, the term of this patent is extended or adjusted under 35 U.S.C. 154(b) by 0 days.

(21) Appl. No.: 09/979,325

(22) PCT Filed: Aug. 5, 1999

(86) PCT No.: PCT/US99/17784

§ 371 (c)(1),
(2), (4) Date: Mar. 6, 2002

(87) PCT Pub. No.: WO00/69784

PCT Pub. Date: Nov. 23, 2000

Related U.S. Application Data

(60) Provisional application No. 60/134,706, filed on May 18, 1999.

(51) Int. Cl.[7] .......................... B32B 17/06; B32B 9/00; B32B 9/04; C23C 14/35

(52) U.S. Cl. ............ 428/428; 204/192.23; 204/192.26; 204/192.16; 428/446; 428/704; 428/543

(58) Field of Search ................ 204/192.12, 192.15, 204/192.16, 192.23, 192.26; 428/428, 446, 704, 543

(56) References Cited

U.S. PATENT DOCUMENTS

| | | | |
|---|---|---|---|
| 4,060,660 A | 11/1977 | Carlson et al. | 428/408 |
| 4,212,903 A | 7/1980 | Schnell et al. | 427/127 |
| 4,568,622 A | 2/1986 | Minami et al. | 430/57 |
| 4,704,339 A | 11/1987 | Green et al. | 428/689 |
| 4,713,311 A | 12/1987 | Senske et al. | 430/127 |
| 4,849,081 A | 7/1989 | Ross | 204/192.15 |
| 4,859,493 A | 8/1989 | Lemelson | 427/45.1 |
| 5,047,131 A | 9/1991 | Wolfe et al. | 204/192.23 |
| RE34,035 E | 8/1992 | Dimigen et al. | 428/244 |
| 5,139,633 A * | 8/1992 | Kashida et al. | 204/192.15 |
| 5,209,996 A | 5/1993 | Kashida et al. | 430/5 |
| 5,346,600 A | 9/1994 | Nieh et al. | 204/192.3 |
| 5,415,756 A | 5/1995 | Wolfe et al. | 204/192.23 |
| 5,476,713 A | 12/1995 | Abiko et al. | 428/332 |
| 5,482,602 A | 1/1996 | Cooper et al. | 204/192.11 |
| 5,618,590 A | 4/1997 | Naruse et al. | 427/528 |
| 5,723,172 A * | 3/1998 | Sherman | 427/109 |
| 5,820,994 A | 10/1998 | Gotoh et al. | 428/451 |

FOREIGN PATENT DOCUMENTS

EP     0470379 A1 * 2/1992 ............ H01J/37/34

OTHER PUBLICATIONS

JP 10–4805 (English abstract).*
JP 3–187039 (English abstract).*

* cited by examiner

Primary Examiner—Steven H. VerSteeg
(74) Attorney, Agent, or Firm—Fredrikson & Byron, P.A.

(57) ABSTRACT

A transparent, scratch-resistant, amorphous, easily washed coating on a transparent substrate, together with a method for its preparation. A substrate such as glass is introduced into a sputtering chamber, a silicon-containing target is sputtered in an atmosphere comprising nitrogen and a hydrocarbon gas to produce on the substrate a film containing a carbide of silicon and a nitride of silicon. The film preferably has a thickness in the range of about 30 Å to about 500 Å, and its surface preferably exhibits a contact angle with water below about 25°. The protective coating may be applied directly to a transparent substrate such as glass, or may be applied as a protective coating over an optical film stack carried by the substrate. If desired, a glass substrate may be coated on one side with the optical film stack and coated on the opposite side with the protective coating.

19 Claims, 1 Drawing Sheet

HARD, SCRATCH-RESISTANT COATINGS FOR SUBSTRATES

This application claims the benefit of Provisional application Ser. No. 60/134,706, filed May 18, 1999.

FIELD OF THE INVENTION

The present invention provides a hard, scratch-resistant, easily washed protective coating for substrates.

BACKGROUND OF THE INVENTION

Glass panes employed in windows and doors, for example, or as mirrors, have outer surfaces that require periodic washing, as with a detergent and water. The surface of sheet glass itself commonly exhibits a high contact angle with the water. That is, water, when applied to the surface of the glass, tends to form discrete droplets or beads. Evaporation of the water beads leaves the entrained or dissolved dirt in the droplets on the glass. In order to be readily cleaned, the surfaces of glass panes should be able to "sheet away" water droplets; that is, the droplets themselves should not bead up but rather should spread out, coalesce, and drain from the glass surface. To achieve this result, the glass surface should form a contact angle with water droplets of not greater than about 25°.

Glass sheets of the type used in windows and doors often bear on one or more surfaces in optical film stacks. Such film stacks are well known in the field, and certain of these coatings have been referred to as "solar mirrors", "low emissivity coatings", etc. They commonly involve the use of a infrared reflective metallic film such as silver together with one or more dielectric films such as zinc oxide. To protect optical film stacks of this type, an outer, protective coating of a nitride such as silicon nitride may be employed. The surface of a silicon nitride generally provides an acceptably low contact angle with water, but silicon nitride itself is not as hard and scratch resistant as is needed. Silicon carbide, on the other hand, is quite hard and scratch resistant, but it, unfortunately, is quite hydrophobic; surfaces of silicon carbide provide high contact angles with water, and accordingly, silicon carbide surfaces become easily spotted and are not easily washed.

It would be desirable to provide an outer, protective coating for a glass substrate that would combine the characteristics of protecting from chemical attack any underlying film stack, provide having a hard and scratch-resistant surface, and yet exhibit good washability.

SUMMARY OF THE INVENTION

It has now been found that silicon carbide and silicon nitride can be combined in a single magnetron sputtered film that is hard and scratch-resistant on the one hand, but that exhibits a low contact angle with water on the other. The protective silicon carbide/silicon nitride coatings of the invention are amorphous, and vary in thickness from about 30 Å to about 500 Å. Water contact angles of the surfaces of these protective coatings is not greater than about 25°, and preferably not greater than about 15°. The protective coatings themselves are manufactured utilizing a magnetron sputtering procedure in which silicon from a silicon target is sputtered in an atmosphere containing both nitrogen and a hydrocarbon gas, preferably methane. The resulting film appears to be a mixed nitride and carbide of silicon, the stoichiometry of the system being susceptible to control through control of the reactive atmosphere in the sputtering chamber. The hydrocarbon gas itself provides hydrogen atoms which, it is believed, is included in the protective coating to fill empty lattice positions and force the correct bonding configuration to result in a hard coating.

The protective silicon nitride/carbide film of the invention preferably is sputtered onto a glass sheet in a magnetron sputtering line comprising a series of sequential magnetron chambers. For reasons of economy, it is greatly desired to perform all of the sputter coating operations on glass sheets in a single pass of the glass sheets through the magnetron coating line, rather than going through the labor-intensive task of collecting coated sheets and physically re-running them through a magnetron sputtering line to apply additional layers. If the protective coating of the invention is to be placed upon an optical film stack carried on one surface of the glass sheet, one or more magnetron sputtering chambers may be employed downstream from the series of sequential magnetron sputtering chambers used to deposit film elements of the optical film stack, the latter chambers being employed to deposit the protective silicon nitride/carbide coating of the invention. If the protective coating is to be applied to the other side of the glass sheet, this too may be accomplished in a single pass of the glass sheet through a series of magnetron coating chambers by sputtering the reverse side of the glass sheet with the silicon nitride/carbide coating of the invention.

Thus, in one embodiment, the invention provides a method of producing a hard, scratch-resistant, easily washed coating on a substrate such as glass. The method comprises introducing the substrate into a magnetron sputtering chamber and sputtering silicon from a silicon target while maintaining in the chamber a reactive atmosphere that includes nitrogen and a hydrocarbon gas, the method producing on the substrate surface an amorphous protective film containing a carbide and a nitride of silicon. The resulting film has a thickness in the range of about 30 Å to about 500 Å, and has a surface exhibiting a contact angle with water of below about 25° and preferably below 15°, with water contact angles of 8° and below being achievable.

Preferably, the molar concentration of hydrocarbon gas in the reactive atmosphere of hydrocarbon gas and nitrogen within the sputtering chamber ranges from about 5% to about 35%. Further, the atomic percentage of carbon to carbon plus nitrogen in the total silicon alloy preferably ranges from about 5% to about 35%.

In another embodiment, the method as defined above is performed in a single magnetron sputtering line and involves the steps of passing the substrate sequentially through a series of magnetron sputtering chambers including one series of chambers for sputtering on one surface of the glass a series of films forming an optical film stack, the sputtering line including at least one chamber in which is sputtered onto the film stack the hard, scratch-resistant coating of the invention. In another embodiment, a single magnetron sputtering line is employed, the line including one series of chambers for sputtering on one surface of the glass a series of films forming an optical film stack, and at least one chamber for sputtering on the reverse side of the substrate the hard, scratch-resistant silicon nitride/carbide coating of the invention.

In another embodiment, the invention relates to a film stack carried on a substrate such as glass. The film stack comprises, from the substrate outwardly, an optical film stack and a hard, scratch-resistant outer protective layer, the latter comprising an amorphous film containing a carbide of silicon and a nitride of silicon. The protective coating has a thickness in the range of about 30 Å to about 500 Å, and has an outer surface exhibiting a contact angle with water not greater than about 25°. The structure of the protective coating is that which is produced by sputtering silicon in a reactive atmosphere containing both nitrogen and a hydrocarbon gas, and results in the inclusion of hydrogen in the protective coating.

DETAILED DESCRIPTION OF THE PREFERRED EMBODIMENTS

Figure 1:
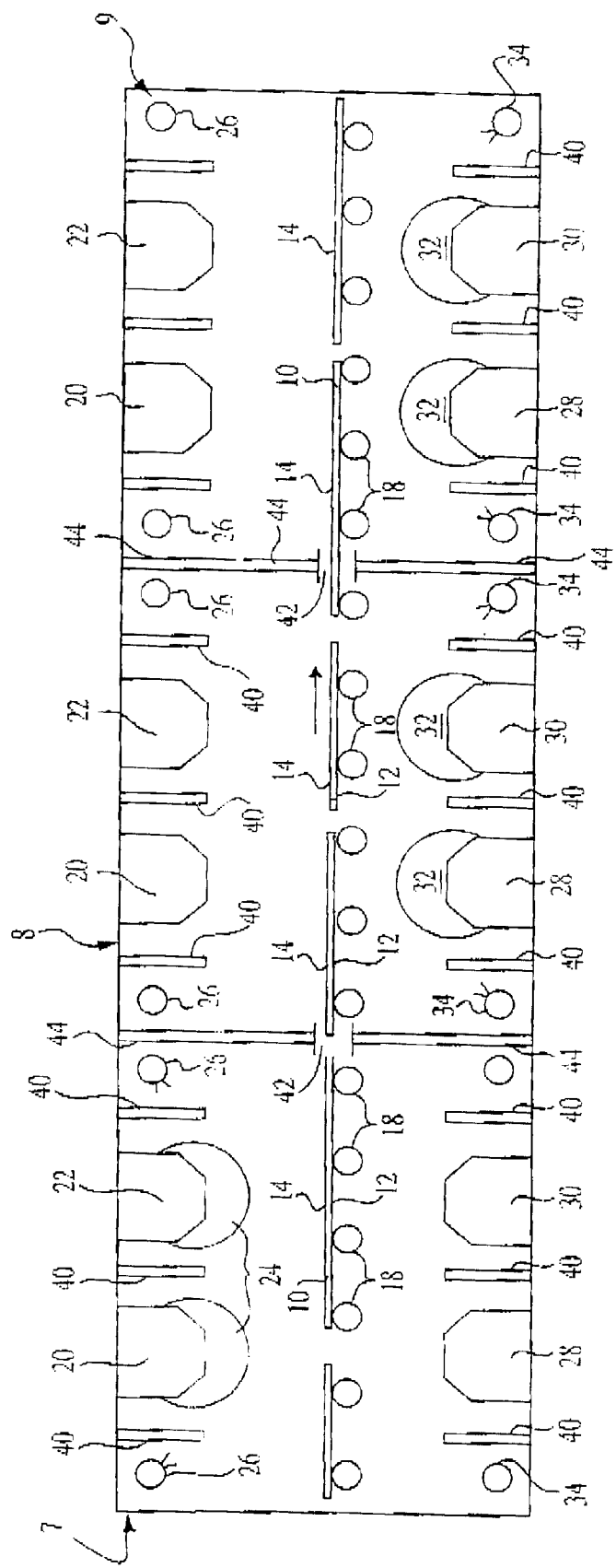
FIG. 1 is a schematic illustration of a multiple chamber magnetron sputtering line for use in accordance with the invention.

The hard, scratch-resistant, easily washed coating of the invention may be applied directly to a glass surface, for example, to the outer surface of a glass sheet used in a window or door or as a mirror, or it may be applied over an optical film stack of the type known to the art. For example, in connection with a mirror, the optical film stack may include one or more highly reflective layers of silver, copper or the like, whereas in transparent windows, the film stack may be of the type known as "solar mirrors" or low emissivity film stack. Film stacks of the latter type commonly are transparent to visible light, and include a metal infrared-reflective layer of silver or the like having on each side of it a dielectric layer such as zinc oxide, tin oxide, titanium dioxide, etc. One example of a useful infrared film stack is disclosed in U.S. Pat. No. 5,302,449 (Eby et al.), the teachings of which are incorporated herein by reference. Optical film stacks to be protected by the protective coatings of the invention may be formed in any desired manner, but preferably are formed through magnetron sputtering techniques.

Magnetron sputtering techniques are well known in the field. An early patent teaching magnetron sputtering is U.S. Pat. No. 4,166,018 (chapin), the teachings of which are incorporated herein by reference. Sputtering techniques involve the formation of a plasma which is contained by a magnetic field and which serves to eject metal atoms from an adjacent metal target, the metal atoms being deposited upon an adjacent surface such as the surface of a glass pane. When sputtering is done in an atmosphere of an inert gas such as argon, the metal alone is deposited, whereas if sputtering is done in the presence of oxygen, e.g., in an atmosphere of argon and oxygen, then the metal is deposited as an oxide.

Magnetron sputtering lines also are well known. These employ a series of aligned magnetron sputtering chambers though which sheets of glass, supported horizontally on rollers, sequentially pass. In a typical magnetron sputtering line, the sputtering chambers include, above the horizontal surface of the glass panes, a target of a metal or metallic compound such as silver, the chambers also being provided with at least one and preferably two anodes in sufficient proximity to the cathodic target to establish a stable plasma. Narrow evacuated tunnels join adjacent sputtering chambers.

Referring first to FIG. 1, a magnetron sputtering coating line is shown having a series of three consecutive coating chambers designated 7, 8 and 9. Although FIG. 1 shows only three magnetron sputtering coating chambers, it will be understood that magnetron sputtering lines may include many more than three chambers.

As shown in FIG. 1, glass sheets 10 pass through the chambers on a series of horizontally elongated rollers 18, the rollers being sufficiently close to one another to adequately support the glass sheets, and in at some instances desirably being far enough apart so as to permit sputtering to occur between the rollers, as will be described below.

Referring to coating chamber 7, upper mounts 20, 22 support sputtering targets 24. Gas supply ports 26 supply the appropriate gas or gases to the chamber 7. For example, if it is desired to sputter zinc oxide upon the upper surface 14 of the glass sheets, the targets 24 may be of zinc and the gas ports at 26 may be employed to provide an atmosphere containing argon and oxygen.

In chamber 8, it will be seen that the upper portion of the chamber does not contain any targets. The bottom portion of this chamber includes target mounts 28, 30 which targets 32, which in this case may be silicon targets. The gas inlet ports 34 in this chamber may supply a mixture of nitrogen and hydrocarbon gas such as methane, argon being employed as necessary to dilute this mixture. Chamber 9 is shown with a similar configuration to that of compartment 8 in the event it is desired to increase the thickness of the silicon carbide/silicon nitride film that is applied to the undersurface 12 of the glass sheets 10. The magnetron sputtering chambers have anodes 40 as needed, and the chambers are separated from one another by narrow passageways 42 formed from walls 44 separating the compartments.

As noted earlier, the concentration of nitrogen and hydrocarbon gas in the sputtering chamber which is employed for producing the protective coating of the invention is important. If the amount of hydrocarbon gas is too little, then the resulting hardness and scratch-resistance of the protective coating is not significantly improved over the hardness and scratch-resistance of silicon nitride itself. On the other hand, if the hydrocarbon gas concentration is too great, then although hardness and scratch-resistance of the coating is substantially improved, the wetability and washability of the surface of the coating may be diminished.

An unexpected result of the use of major amounts of nitrogen and minor amounts of hydrocarbon gas is that the hardness of the protective coating can be increased without significant deterioration of the washability of the surface of the coating. Preferably, the atmosphere within the magnetron sputtering chamber contains from about 5% to about 35% of hydrocarbon gas, based on the combined nitrogen and hydrocarbon gases. In any event, the desired properties of the coating surface—that is, hardness and scratch-resistance vs. wetability—may be adjusted as needed by adjusting the relative concentrations of nitrogen and hydrocarbon gas in the coating chamber and some control over stoichiometry may be obtained through the use of diluent gases such as argon in the coating chamber. Hydrocarbon gases useful with the present invention include the lower hydrocarbons such as methane and ethane, and unsaturated hydrocarbon compounds such as acetylene, and mixtures of such gases.

For the protective coatings of the invention to provide substantial physical protection against scratching an abrasion, it is desired that the films be at least 30 Å in thickness. On the other hand, it is also important that the films themselves not be of such a thickness as to unduly compromise the optical properties of the resulting product, nor prevent the product from being heat-tempered or heat-bent, as the case may be in connection with glass that is to be used for forming windshields, automobile mirrors or other curved objects. Accordingly, it is desired that the thickness of the protective coating not exceed about 500 Å. A preferred thickness range is about 30 Å to about 150Å.

As noted earlier, the protective films of the invention may be applied directly to a glass sheet, or may be applied as a protective layer over an optical film stack carried by the glass sheet. It is important from an economic standpoint to be able to apply all of the coatings that are needed to a glass sheet as the sheet undergoes one pass in one direction through the magnetron sputtering line. If the protective coating is to be applied over a film stack, then the magnetron sputtering line will include a first series of sputtering chambers through which the glass sheets sequentially pass and which deposit on the glass sheets the various components of the desired optical film stack. One or more further chambers, then, are employed downstream from the first series to apply, over the optical film stack, the protective coating. If the film stack is to be applied to one side of the glass sheet, and the protective coating to the other side of the sheet (to improve the second surface in the event that it is to be exposed during use), then one or more coating chambers may be so arranged as to sputter coat the other surface of the glass sheet, as depicted in FIG. 1. In this embodiment, the protective layer can be applied at any desired point during the travel of the glass sheets through the magnetron coating line, and, if desired, the protective coating can be applied simultaneously with application of one more of the components of the optical film stack. Desirably, however, the protective coating is applied downstream from the chambers employed to apply the optical film stack.

EXAMPLE

Glass sheets with cleaned upper surfaces are passed through an Airco magnetron sputtering chamber equipped with a cathodic silicon target and gas inlet ports for introducing, respectively, nitrogen and methane to the chamber. A reactive atmosphere of about 30 mole percent of methane and 70 mole percent of nitrogen is introduced into and maintained in the chamber during the sputtering procedure, and a protective film of a carbide and a nitride of silicon is deposited on the glass surface to a thickness of about 50Å. The film is found to be hard and scratch resistant, and exhibits a water contact angle 6° to 8°.

While a preferred embodiment of the present invention has been described, it should be understood that various changes, adaptations and modifications may be made therein without departing from the spirit of the invention and the scope of the appended claims.

What is claimed is:

1. Method of producing a hard, scratch-resistant amorphous, easily washed coating on a substrate, comprising introducing said substrate into a magnetron sputtering chamber, and sputtering silicon from a silicon target while maintaining in said chamber a reactive atmosphere that includes nitrogen and a hydrocarbon gas to produce on said substrate a protective film, the film having a thickness in the range of about 30 Å to about 500 Å and having a contact angle with water below about 25°.

2. The method of claim 1 wherein the molar concentration of hydrocarbon gas in said atmosphere of nitrogen and hydrocarbon gas ranges from about 5% to about 35%.

3. The method of claim 2 wherein said substrate is glass having an optical film stack thereon, said hard, scratch-resistant coating being formed on said film stack.

4. The method of claim 2 wherein said substrate is glass having an optical film stack on one surface thereof, said hard, scratch-resistant coating being formed on an opposite surface thereof.

5. The method of claim 2 wherein said substrate is glass, said method including the steps of passing said substrate sequentially through a series of magnetron sputtering chambers including one series of chambers for sputtering on one surface of the glass a series of films forming an optical film stack, and at least one chamber for sputtering on said film stack said hard, scratch-resistant amorphous coating.

6. The method of claim 2 wherein said substrate is glass, said method including the steps of passing said substrate sequentially through a series of magnetron sputtering chambers including one series of chambers for sputtering on one surface of the glass a series of films forming an optical film stack, and at least one chamber for sputtering on the reverse side of said substrate said hard, scratch-resistant amorphous coating.

7. The method of claim 1 wherein the atomic percentage of carbon to carbon plus nitrogen in said protective layer ranges from about 5% to about 35%.

8. The method of claim 7 wherein said substrate is glass having an optical film stack thereon, said hard, scratch-resistant coating being formed on said film stack.

9. The method of claim 7 wherein said substrate is glass having an optical film stack on one surface thereof, said hard, scratch-resistant coating being formed on an opposite surface thereof.

10. The method of claim 7 wherein said substrate is glass, said method including the steps of passing said substrate sequentially through a series of magnetron sputtering chambers including one series of chambers for sputtering on one surface of the glass a series of films forming an optical film stack, and at least one chamber for sputtering on said film stack said hard, scratch-resistant amorphous coating.

11. The method of claim 7 wherein said substrate is glass, said method including the steps of passing said substrate sequentially through a series of magnetron sputtering chambers including one series of chambers for sputtering on one surface of the glass a series of films forming an optical film stack, and at least one chamber for sputtering on the reverse side of said substrate said hard, scratch-resistant amorphous coating.

12. The method of claim 1 wherein said substrate is glass having an optical film stack thereon, said hard, scratch-resistant coating being formed on said film stack.

13. The method of claim 1 wherein said substrate is glass having an optical film stack on one surface thereof, said hard, scratch-resistant coating being formed on an opposite surface thereof.

14. The method of claim 1 wherein said substrate is glass, said method including the steps of passing said substrate sequentially through a series of magnetron sputtering chambers including one series of chambers for sputtering on one surface of the glass a series of films forming an optical film stack, and at least one chamber for sputtering on said film stack said hard, scratch-resistant amorphous coating.

15. The method of claim 1 wherein said substrate is glass, said method including the steps of passing said substrate sequentially through a series of magnetron sputtering chambers including one series of chambers for sputtering on one surface of the glass a series of films forming an optical film stack, and at least one chamber for sputtering on the reverse side of said substrate said hard, scratch-resistant amorphous coating.

16. The method of claim 15 wherein said method includes the step of simultaneously sputtering on both sides of said substrate in at least one sputtering chamber, an element of said optical film stack being sputtered on one surface of the substrate and said hard, scratch-resistant amorphous coating being sputtered on an opposite surface.

17. The method of claim 1 wherein the protective film includes a carbide of silicon and a nitride of silicon.

18. A film stack on a substrate, comprising, from the substrate outwardly, an optical film stack and a hard, scratch-resistant outer protective coating, the latter comprising an amorphous film containing a carbide of silicon and a nitride of silicon and having a thickness in the range of about 30 Å to about 500 Å, the protective coating having a surface exhibiting a contact angle with water not greater than 25°.

19. The film stack of claim 18 wherein said hard, scratch-resistant outer protective layer is formed in a magnetron sputtering chamber by magnetron sputtering silicon from a silicon target while maintaining in said chamber a reactive atmosphere that includes nitrogen and a hydrocarbon gas.

\* \* \* \* \*